Dec. 13, 1966   H. A. RALSTON   3,291,222
AGRICULTURAL IMPLEMENT
Filed Jan. 13, 1964

INVENTOR.
HAROLD A. RALSTON.
BY
Emerson B Donnell

United States Patent Office 3,291,222
Patented Dec. 13, 1966

3,291,222
AGRICULTURAL IMPLEMENT
Harold A. Ralston, Rockford, Ill., assignor to J. I. Case Company, Racine, Wis., a corporation of Wisconsin
Filed Jan. 13, 1964, Ser. No. 337,235
9 Claims. (Cl. 172—75)

The present invention relates to agricultural implements and particularly to mechanism such as planters, fertilizer distributors and the like having parts which must be driven in order to be effective, such as the seed plates in planters for example. It is particularly adapted for such implements carried on what is known in the trade as a toolbar, and relates especially to the mechanism for actuating the driven parts, or feed drive means.

Such implements are commonly mounted so that they can be supported clear of the ground in an inoperative position when going to the field, turning at the ends of the rows, crossing roads, ditches and the like, and so that they can be lowered to a working position and raised to such non-working or inoperative position promptly, as often as necessary. It is desirable in a planter or similar mechanism that the feeding of seeds or the like be automatically stopped whenever the implement is raised into inoperative position, and promptly started again when the implement is once more lowered into operative position, to avoid waste of seeds or other material, and to insure planting or dispensing whenever the device is in operative position; and accordingly, an object of the invention is to provide a mechanism which will start the feeding action dependably and promptly upon lowering of the implement, and which will stop the action immediately when the implement is raised, all without any particular attention on the part of the tractor operator.

Toolbars and other tractor-mounted implements are commonly carried on what has come to be known as a three-point hitch, which is well known and constitutes a part of the tractor. It includes power mechanism for raising and lowering any implement connected to the hitch, and is characterized by the fact that such an implement, when raised from a lower operating position to an upper inoperative position, moves in a path which extends upwardly and forwardly, at least in part, as related to the tractor, and this peculiar movement is utilized in achieving the novel operation of the present feed drive means.

The manner in which this object is accomplished is fully set forth in the following specification and shown in the accompanying drawings in which.

Similar reference characters have been applied to the same parts wherever they occur throughout the drawings and specification.

Figures 1, 2:
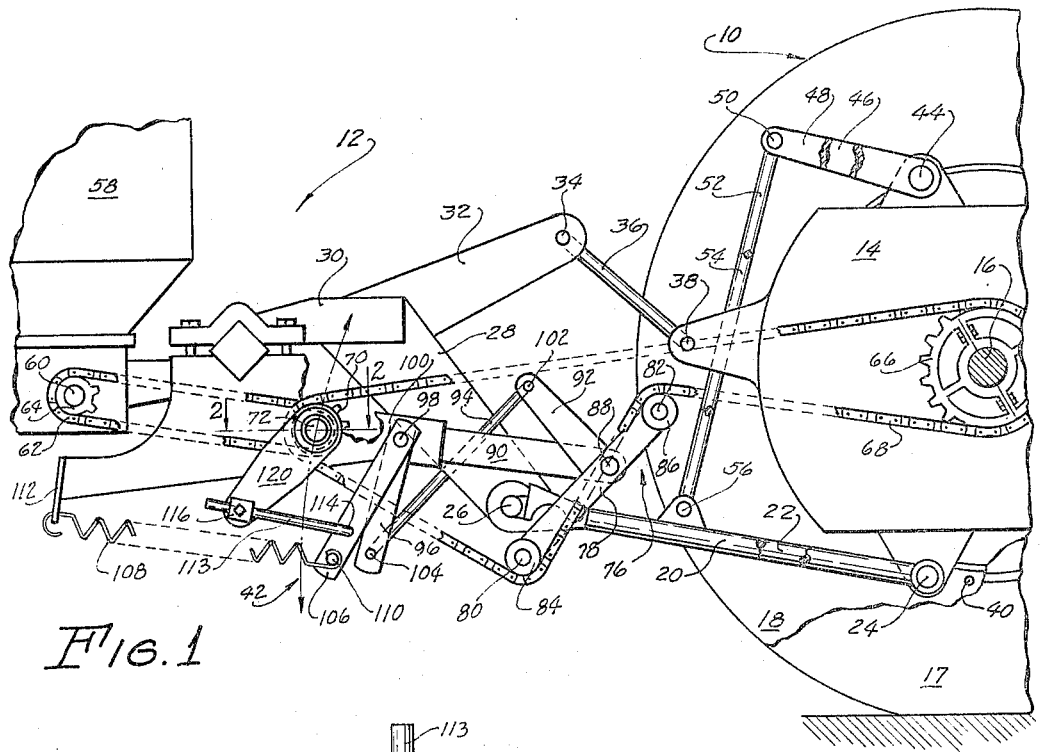
FIG. 1 is a side elevation of so much of a tractor with an attached toolbar and planter, with parts removed, as is necessary for an understanding of the invention.
FIG. 2 is a fragmentary horizontal section on the line 2—2 of FIG. 1, oriented as seen from the tractor.

The machine, illustrative of the invention as seen in FIG. 1, is mounted on a tractor generally designated as 10, and which is to be understood to have the usual essential parts to be operative and to pull or propel the implement, generally designated as 12. The tractor includes a body or transmission portion 14 having an axle 16 on which is mounted a traction wheel 17. Another traction wheel 18 is mounted on a companion axle not shown, on the far side of the tractor in the usual manner, so that the rear portion of the tractor is supported, the wheels being rotatable by the power of the tractor for propulsion purposes. The tractor has a pair of laterally spaced lower draft links 20 and 22 pivoted to the tractor on pins, such as 24, and extending backwardly into engagement with pin such as 26, carried on rigid arms 28 extending forwardly from a toolbar structure 30 constituting part of implement 12. Toolbar 30 has an upwardly and forwardly extending mast 32 which is rigid with bar 30 and therefore with arms 28 and which is connected by means of a pivot pin 34 with an upper link 36 pivoted to the tractor body on a pivot pin 38. The whole represents an example of a toolbar connected to a tractor by means of a three-point hitch of well known form, the toolbar being free to swing up and down about a virtual hitch point 40 so that in swinging, toolbar 30 and the entire implement 12 will swing generally upwardly and forwardly or downwardly and rearwardly, as indicated by the arrow 42.

The assemblage is raised and lowered by the power of the tractor in well-known manner, the tractor having a rockshaft 44 which may be rocked by means of suitable mechanism forming part of the tractor. Rockshaft 44 has rearwardly extending arms 46 and 48 which are connected by pins such as 50, with rods 52 and 54 which are in turn pivoted by means of pins such as 56 to links 20 and 22, so that rocking of rockshaft 44 will swing links 20 and 22 about pins 24 and thereby raise and lower toolbar structure 30 and any implement attached thereto.

As a typical implement which the device may serve, a planter or fertilizer distributor 58 of well-known type has a feed shaft 60 which is rotated by means of a chain 62 engaged with a sprocket 64. As stated, it is desirable that shaft 60 shall operate whenever implement 58 is lowered, and shall cease operation whenever implement 58 is raised.

The drive for shaft 60 comes from the tractor axle 16.

A sprocket or other wheel member 66 is fixed on axle 16 and is engaged by a chain or flexible element 68, which extends rearwardly and engages a sprocket 70 which may be clutched to a jack shaft 72. A suitable sprocket 74 fixed on jack shaft 72 (see also FIG. 2) is engaged with chain 62 so that the drive is transmitted to shaft 60.

It will now be apparent that, in view of the path of toolbar 30 as it is raised and lowered by the action of rockshaft 44, that chain 68 will be tighter, or more properly, the center distance between the axle 16 and jack shaft 72 will be greater when toolbar 30 is lowered than it will be when toolbar 30 is raised; and this fact is utilized to control the clutching of sprocket 70 to jack shaft 72.

As seen in FIG. 1, a tightener 76 in the form of a bar 78 carries, on pins 80 and 82, pulleys, rollers or chain engaging members 84 and 86, the lower run of chain or flexible element 68 passing above roller 86 and below roller 84. Bar 78 is pivoted on a suitable bearing 88 supported on an arm 90 rigid with toolbar structure 30. Bar 78 is urged, as will appear, in a counterclockwise direction, as seen in FIG. 1. In this way, chain 68 is maintained under suitable tension. As the center distance between axle 16 and jack shaft 72 is increased by lowering the implement, bar 78 will be rotated in a clockwise direction. Similarly, as the center distance between axle 16 and jack shaft 72 is decreased, as by raising toolbar 30, bar 78 will be permitted to rock in a counterclockwise direction, and it will be noted that the relatively small change in the center distance aforesaid, will cause a relatively substantial change in the position of bar 78. Bar 78 or tightener 76 therefore serves as a motion multiplying means to develop a useful amount of rotation by reason of the relatively small change in distance between axle 16 and jack staft 72.

Bar 78 has an upstanding arm 92 connected by a link 94 with an arm 96. Arm 96 is fixed on a rockshaft 98, journaled in a body portion 100, at the far side thereof, as seen in FIG. 1. Link 94 is connected to arm 92 by means of a pivot 102 and to arm 96 by means of a pivot 104.

Rockshaft 98 has fixed thereon, a lever 106 which extends generally downwardly on the near side of body portion 100 and substantially parallel to arm 96. Lever 106 is urged in a clockwise direction by means of a spring 108, tensioned between an anchorage 110 thereon and a bracket or the like 112, fixed in any suitable manner in relation to toolbar 30. In this manner, rockshaft 98 is continuously urged in a clockwise direction, while bar 78, through link 94 is continually urged in a counterclockwise direction.

Lever 106 has pivoted thereto, a link 113 by means of a pivot 114, link 113 being clamped in a trunnion block 116 pivoted on a pin 118, FIG. 2, journaled in a lever arm 120. Lever arm 120 consistutes part of a clutch which, as will now be apparent, may be controlled by the rocking of lever 106 and tightener 76.

The type of clutch controlled by lever arm 120 forms no part of the present invention, but a suitable and typical type will now be described.

Shaft 72 has journaled thereon, above-mentioned sprocket 70 which has a hub portion 122, FIG. 2, journaled for rotation in above-mentioned body portion 100, hub portion 122 also serving as a bearing for shaft 72. As so far described, rotation of sprocket 70 would therefore not drive shaft 72. Hub portion 122 at the end remote from sprocket 70 is provided with a plurality of clutch teeth 124, preferably housed within body portion 100, and also has a groove 126 into which projects a stud 128 which prevents unwanted axial movement of hub 122, the latter however being free to rotate within body 100.

Axially of hub 122 and beyond teeth 124, a clutch element 130 is slidably mounted on shaft 72 and has a slot 132 in which is engaged a pin 134 fixed in shaft 72 so that clutch 130 is freely slidable on shaft 72, but may not rotate except by also rotating shaft 72. A spring 136 surrounds shaft 72 and is compressed between a washer 138 and clutch element 130, normally urging clutch 132 toward the right in FIG. 2. Clutch element 130 has an enlarged portion 139 carrying a plurality of teeth 140 which, when clutch element 130 is shifted to the right, engage above-mentioned teeth 124. Under these conditions, rotation of sprocket 70 and hub 122 will cause rotation of clutch element 130 and, through pin 134, rotation of shaft 72.

Clutch element 130 has a flange 142 which is engaged by a shipper element 144 rockable about enlarged portion 139, and in the present instance forming a part of above-mentioned arm 120. Shipper 144 has cam portions 146 and 148 which in one position engage with cam portions 150 and 152, respectively on body portion 100. In the position shown in FIG. 2, cam portions 146 and 150 (and cam portions 148 and 152) have interacted by reason of swinging of the shipper with lever 120 so that shipper 144 has been forced to the left, thereby through flange 142, forcing clutch 130 to the left, compressing spring 136 and removing teeth 140 from engagement with teeth 124. Sprocket 70 is therefore free to rotate without driving shaft 72. This is the condition shown in FIG. 1, and which would obtain whenever toolbar 30 was raised. As will be apparent, rocking of arm 120 counterclockwise, as seen in FIG. 1, will displace cam 146 from cam 150, and cam 148 from cam 152, so that spring 136 will force clutch 130 toward the right and cause engagement of teeth 140 with teeth 124. Since sprocket 70 would be rotating under these conditions, such action would start rotation of shaft 72, and dispensing of material from implement 58.

The operation of the device is thought to be clear from the foregoing description, it being observed that the raising and lowering of toolbar 30 will necessarily cause a change in the center distance between axle 16 and shaft 72, and such change, because of the fixed length of chain 68, will cause substantial rocking movement in tightener 76. Through link 94, rockshaft 98, lever arm 106, and rod 113, this movement will be transmitted to lever arm 120 to engage clutch 130 when the implement is lowered, and to disengage clutch 130 when the implement is raised.

Variations on the disclosed arrangement may occur to those familiar with this art, and it is to be understood that the invention is not to be taken as limited by this disclosure, or in fact, in any manner, except as defined in the following claims.

What is claimed as new and desired to be secured by Letters Patent of the United States is:

1. In a tractor mounted implement of the distributor type including means for raising and lowering the implement and an endless flexible element extended from the tractor to the implement,
   means responsive to the tension in said flexible element, feeding means on said implement actuated by said flexible element, and
   control means connected to and actuated by said tension responsive means to start and stop the actuation of said feeding means by said flexible element.

2. In a control for a driving mechanism for use in an implement of the distributor type carried on a tractor and including a driven shaft and an endless flexible element extending from the tractor to the implement for actuating the driven shaft, said implement having clutch means controlling the actuation of said driven shaft by said flexible element, the combination of
   means for raising and lowering said implement in a path such that the tension in said flexible element will be changed by such raising and lowering movement, and
   motion multiplying means connected to said clutch means and responsive to the changes in tension in said flexible element and operable by reason of changes in said tension to control said clutch means.

3. In a control for a driving mechanism for use in an implement of the distributor type carried on a tractor and including a driven shaft and an endless flexible element extending from the tractor to the implement for actuating the driven shaft, said implement having clutch means controlling the actuation of said driven shaft by said flexible element; the combination of
   means for raising and lowering said implement in a path such that the tension in said flexible element will be changed by such raising and lowering movement, and
   means connected to said clutch means and responsive to the tension in said flexible element and operable by reason of changes in said tension to control said clutch means.

4. In an agricultural implement of the distributor type for mounting on a tractor, a support carried on the tractor for movement from an operating position upwardly and forwardly in relation to the tractor to an inoperative position, a driven shaft on the support, a driven sprocket on the support, a driving sprocket on the tractor, a chain disposed about said sprockets,
   clutch means slidable on said driven shaft and interposed in driving relation between said driven sprocket and said driven shaft, and
   means including an elongated element for sensing the tension in said chain and arranged to engage said clutch means when said chain is tight, and to disengage said clutch means when said chain is slack.

5. In an agricultural implement of the distributor type to be mounted on a tractor, a support carried on said tractor for upward and forward movement from a working position to an inoperative position, a driving shaft on the tractor, a driven shaft on the support, a driving wheel on said driving shaft, a driven wheel on said support, a flexible element disposed about said driving and driven wheels,
   a tightener engaged with said flexible element, resilient means arranged to urge said tightener against said flexible element to maintain desired tension therein, clutch means slidable on said driven shaft and interposed between said driven wheel and said driven shaft, control mechanism operable for engaging and disengaging said clutch, and means connected to said tightener and to said control mechanism arranged to engage said clutch upon movement of said tightener in the directon caused by lowering said support and tightening said flexible element, and to disengage said clutch upon movement of said tightener in the direction caused by raising said support and loosening said flexible element.

6. An agricultural implement of the distributor type comprising a support carried on the tractor for upward movement in a predetermined path from a working to an inoperative position, a driving shaft on the tractor, a driven shaft on the support, a driving sprocket on the driving shaft, a driven sprocket on the support, an endless chain disposed about said driving and driven sprockets, said predetermined path being such that up-and-down movement of said support will cause a change in the distance between said driving sprocket and said driven sprocket, clutch means interposed between said driven sprocket and said driven shaft, a chain tightener including
an elongated element rockably mounted on said support, a chain engaging member on one end of said elongated element engaged with a run of said chain and a second chain engaging member on the other end of said elongated element, engaged with a run of said chain, means yieldably urging said elongated element in a direction to press said chain engaging members against said chain, lever means for engaging and disengaging said clutch, and means connected with said elongated element and with the clutch engaging and disengaging means, and operable to engage and disengage said clutch in response to rocking of said elongated element.

7. An argicultural implement of the distributor type comprising a support carried on the tractor for upward movement in a predetermined path from a working to an inoperative position, a driving shaft on the tractor, a driven shaft on the support, a driving sprocket on the driving shaft, a driven sprocket on the support, an endless chain disposed about said driving and driven sprockets, said predetermined path being such that up-and-down movement of said support will cause a change in the distance between said driving sprocket and said driven sprocket, clutch means interposed between said driven sprocket and said driven shaft, a chain tightener including
an elongated element rockably mounted on said support, a chain engaging member on one end of said elongated element engaged with one side of a run of said chain and a second chain engaging member on the other end of said elongated element, engaged with the other side of said run of said chain, means yieldably urging said elongated element in a direction to press said chain engaging members against said chain, lever means for engaging and disengaging said clutch, and linkage means connected with said elongated element and with the clutch engaging and disengaging means, and operable to engage and disengage said clutch in response to rocking of said elongated element.

8. In a planter type implement for mounting on a tractor, a support carried on the tractor adapted for raising said implement from an operative to an inoperative position and for lowering the implement from an inoperative to an operative position, a driving sprocket on the tractor, a driven shaft on the support, a driven sprocket on the driven shaft, a chain disposed about said sprockets, clutch means slidable on said driven shaft for connecting said driven sprocket and said driven shaft, tensioning means pivoted on said support engageable with said chain, resilient means urging said tensioning means against said chain, cam means on said support for engaging and disengaging said clutch means, and linkage means connected with said tensioning means and with said cam means operable to engage and disengage said clutch means as said support is moved in response to pivoting of said tensioning means.

9. An agricultural implement of the planter type adapted to be carried on a tractor, said implement including a support structure, a driven shaft on said structure, a driven sprocket on said driven shaft, said sprocket being driven from said tractor, means for driving said driven sprocket from said tractor, a tightener pivoted on said support structure and having rollers engageable with said driving means, clutch means having cam elements slidable on said driven shaft, resilient means urging said tightener against said driving means, lever means on said driven shaft for engaging and disengaging said clutch means, and linkage means connected with said tightener and with said lever means operable to engage and disengage said clutch means as said support structuer is moved in response to pivoting of said tightener.

References Cited by the Examiner

UNITED STATES PATENTS

| | | | |
|---|---|---|---|
| 2,656,801 | 10/1953 | Hansen et al. | 111—67 X |
| 2,659,447 | 11/1953 | Wetmore | 172—75 X |
| 2,755,002 | 7/1956 | Gustafson. | |

ABRAHAM G. STONE, *Primary Examiner.*

R. L. HOLLISTER, *Assistant Examiner*